(12) United States Patent
Sittig et al.

(10) Patent No.: US 12,134,131 B2
(45) Date of Patent: Nov. 5, 2024

(54) METHODS AND APPARATUS FOR RECOATING PARAMETER CONTROL

(71) Applicant: GENERAL ELECTRIC COMPANY, Schenectady, NY (US)

(72) Inventors: Dominic Sittig, Lichtenfels (DE); Dominik Mueller, Renchen (DE); Dominic Graf, Lichtenfels (DE); Juergen Werner, Lichtenfels (DE)

(73) Assignee: General Electric Company, Evendale, OH (US)

( * ) Notice: Subject to any disclaimer, the term of this patent is extended or adjusted under 35 U.S.C. 154(b) by 444 days.

(21) Appl. No.: 17/349,543

(22) Filed: Jun. 16, 2021

(65) Prior Publication Data

US 2022/0402041 A1 Dec. 22, 2022

(51) Int. Cl.
| | | |
|---|---|---|
| *B22F 12/67* | (2021.01) | |
| *B22F 10/28* | (2021.01) | |
| *B22F 10/85* | (2021.01) | |
| *B22F 12/00* | (2021.01) | |
| *B22F 12/41* | (2021.01) | |
| *B33Y 30/00* | (2015.01) | |
| *B33Y 50/02* | (2015.01) | |
| *B22F 10/37* | (2021.01) | |
| *B29C 64/214* | (2017.01) | |

(52) U.S. Cl.
CPC .............. *B22F 12/67* (2021.01); *B22F 10/28* (2021.01); *B22F 10/85* (2021.01); *B22F 12/224* (2021.01); *B22F 12/41* (2021.01); *B33Y 30/00* (2014.12); *B33Y 50/02* (2014.12); *B22F 2203/00* (2013.01)

(58) Field of Classification Search
CPC .......... B22F 12/67; B22F 10/28; B22F 10/85; B22F 12/224; B22F 12/41; B22F 2203/00; B22F 10/37; B22F 10/38; B33Y 30/00; B33Y 50/02; B33Y 10/00; B29C 64/214; B29C 64/393
USPC .......................................................... 700/98
See application file for complete search history.

(56) References Cited

U.S. PATENT DOCUMENTS

| | | | |
|---|---|---|---|
| 10,646,924 B2 | 5/2020 | Spears et al. | |
| 2015/0367415 A1 | 12/2015 | Buller et al. | |
| 2017/0266704 A1* | 9/2017 | Breuer ............... | B22D 11/0622 |
| 2018/0200791 A1* | 7/2018 | Redding ............... | B29C 64/153 |
| 2020/0101663 A1 | 4/2020 | Prakash et al. | |

FOREIGN PATENT DOCUMENTS

| | | |
|---|---|---|
| DE | 102006056422 | 4/2008 |
| EP | 1439050 | 7/2004 |
| EP | 3461574 | 4/2019 |
| FR | 3081755 | 12/2019 |
| WO | 2017143145 | 8/2017 |

* cited by examiner

*Primary Examiner* — Michael J Brown
(74) *Attorney, Agent, or Firm* — Hanley, Flight & Zimmerman, LLC

(57) ABSTRACT

Methods and apparatus for recoating parameter control are disclosed. An example apparatus disclosed herein includes a blade holder, a blade, and a control element disposed within the blade holder, the control element to move the blade between a first position and a second position, the apparatus having a first stiffness when the blade is in the first position, the apparatus having a second stiffness when the blade is in the second position, the first stiffness greater than the second stiffness.

20 Claims, 7 Drawing Sheets

METHODS AND APPARATUS FOR RECOATING PARAMETER CONTROL

FIELD OF THE DISCLOSURE

This disclosure relates generally to additive manufacturing and, more particularly, to methods and apparatus for recoating parameter control.

BACKGROUND

Additive manufacturing technologies (e.g., 3D printing) permit formation of three-dimensional parts from computer-aided design (CAD) models. For example, a 3D printed part can be formed layer-by-layer by adding material in successive steps until a physical part is formed. Numerous industries (e.g., engineering, manufacturing, healthcare, etc.) have adopted additive manufacturing technologies to produce a variety of products, ranging from custom medical devices to aviation parts.

BRIEF DESCRIPTION OF THE DRAWINGS

The figures are not to scale. Wherever possible, the same reference numbers will be used throughout the drawing(s) and accompanying written description to refer to the same or like parts.

BRIEF SUMMARY

Figure 1:
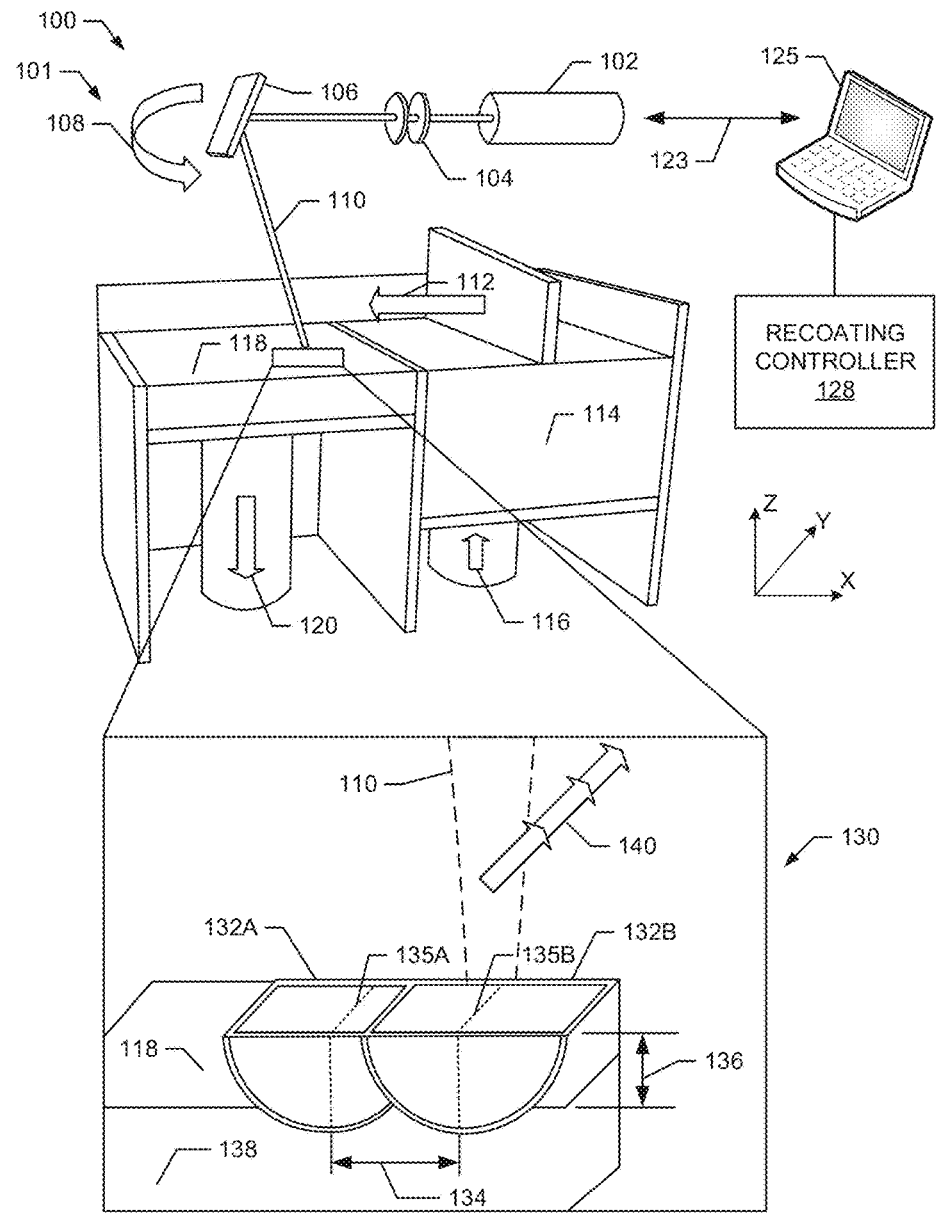
FIG. 1 illustrates an example additive manufacturing process in which the methods and apparatus disclosed herein can be implemented.

Aspects and advantages of the disclosure will be set forth in part in the following description, or may be obvious from the description, or may be learned through practice of the presently disclosed technology. In one aspect, the present disclosure is directed towards an apparatus. The apparatus disclosed herein includes a blade holder, a blade, and a control element disposed within the blade holder, the control element to move the blade between a first position and a second position, the apparatus having a first stiffness when the blade is in the first position, the apparatus having a second stiffness when the blade is in the second position, the first stiffness greater than the second stiffness.

A further aspect of the disclosure is directed towards a non-transitory computer readable medium including instructions, when executed, cause a machine to form a first layer of a part by joining a portion of substrate material via an additive manufacturing technique, recoat the substrate material via a blade having a first stiffness, determine, based on a geometry of the first layer of the part, a second stiffness, modify the blade to have the second stiffness by adjusting a control element within the blade, and recoat the substrate material via the blade.

A further aspect of the disclosure is directed towards an apparatus for manufacturing an object via additive manufacturing including a bed including a material substrate, a beam emitter, and a recoater to coat material across the bed, the recoater including a blade holder, a blade, and a control element disposed within the blade holder, the control element to move the blade between a first position and a second position, the apparatus having a first stiffness when the blade is in the first position, the apparatus having a second stiffness when the blade is in the second position, the first stiffness greater than the second stiffness.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

As used herein, the terms "system," "unit," "module," "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, component, and/or systems shown in the attached figures may represent the hardware that operates based on software or hardwired instructions, the software that directs hardware to perform the operations, or a combination thereof.

Additive manufacturing (AM), also known as 3D-printing, permits the formation of physical objects from three-dimensional (3D) model data using layer-by-layer material addition. For example, consumer and industrial-type 3D printers (also referred to as AM devices or AM apparatus) can be used for the fabrication of 3D objects, with the goal of replicating a structure generated using computer-aided design (CAD) software. Complex 3D geometries including high-resolution internal features can be printed without the use of tooling, with sections of the geometries varied based on the type of material selected for forming the structure. However, 3D printing requires the assessment of printing parameters, such as 3D printer-specific settings, to determine which parameters result in the highest quality build (e.g., limiting the presence of defects and/or deviations from the original CAD-based model). Such a process is especially critical when 3D printed parts and/or objects are used in products intended for human use (e.g., aviation, medicine, etc.), as opposed to just prototyping needs. However, assessment of the parameters to improve 3D printed object quality is time-consuming and expensive, given that numerous tests are to be run and numerous 3D printed parts are to be evaluated prior to identifying the parameters that are most appropriate for a given 3D printing process. Additionally, the parameters change from 3D printer to 3D printer, making the selection of parameters more intensive and introducing variations that are difficult to account for from one additive manufacturing process to another. Accordingly, methods and apparatus that permit an expedited and/or automated process of 3D printer-specific parameter adjustments would be welcomed in the technology.

AM-based processes are diverse and include powder bed fusion, material extrusion, and material jetting. For example, powder bed fusion uses either a laser or an electron beam to melt and fuse the material together to form a 3D structure. Powder bed fusion can include multi jet fusion (MJF), direct metal laser sintering (DMLS), direct metal laser melting (DMLM), electron beam melting (EBM), selective laser sintering (SLS), among others. For example, DMLM uses lasers to melt ultra-thin layers of metal powder to create the 3D object, with the object built directly from a CAD file (e.g., .STL file) generated using CAD data. Using a laser to selectively melt thin layers of metal particles permits objects to exhibit homogenous characteristics with fine details. A variety of materials can be used to form 3D objects using additive manufacturing, depending on the intended final application (e.g., prototyping, medical devices, aviation parts, etc.). For example, the DMLM process can include the use of titanium, stainless steel, superalloys, and aluminum, among others. For example, titanium can withstand high pressures and temperatures, superalloys (e.g., cobalt chrome) can be more appropriate for applications in jet engines (e.g., turbine and engine parts) and the chemical industry, while 3D printed parts formed from aluminum can be used in automotive and thermal applications.

Powder bed fusion techniques such as DMLM use a fabrication process that is determined by a range of controlled and uncontrolled process parameters. For example, there are a variety of printing parameters associated with the laser (e.g., strength, shape, size, etc.) that can be controlled during manufacturer. Another set of additive manufacturing parameters relate to the recoating of the powder bed between layer fusion (e.g., recoater position, recoater speed, etc.). Such recoating parameters can affect the speed and tolerancing of the manufactured process. Additionally, inappropriately selected recoating parameters can cause the recoating mechanism (e.g., a roller, a blade, a rake, etc.) to damage the previously deposited layers. As such, proper control of the recoating process reduces the presence of defects in the layer-by-layer build of a 3D object and increases the productivity of the additive manufacturing process.

Examples herein are described with respect to a reference coordinate system. As used herein, the orientation of features, forces, and moments are described with reference to an X-axis, a Y-axis, and a Z-axis of an additive manufacturing device and products generated by the additive manufacturing device In general, the attached figures are annotated with a set of axes including the X-axis, Y-axis, and Z-axis. In the examples described herein, the X-axis corresponds to a direction parallel to the movement of a recoater of the AM apparatus. In the examples described herein, the Y-axis corresponds to directions parallel to the length of the recoater. In the examples disclosed herein, the Z-axis corresponds to directions parallel to the movement of the printer bed during the operation of the device. As used herein, the term "longitudinal" is used interchangeably to refer to directions parallel to the X-axis. As used herein, the term "lateral" is used to refer to directions parallel to the Y-axis. As used herein, the term "vertical" and "normal" are used interchangeably to refer to directions parallel to the Z-axis.

A recoating process spreads layers of powder for each layer of a component. However, complex layer geometries, such as overhanging features and thin walls, can be damaged during the recoating process. The stiffness of the recoater blade affects the manufacturing process and associated manufacturing tolerance. For example, a comparatively flexible recoater blade (e.g., a rubber blade, etc.) can negatively affect the tolerancing of the manufactured part due to relief hysteresis (e.g., elastic hysteresis, etc.). Particularly, as the flexible recoater blade is repeatedly stressed during recoating, the recoating process can change the physical dimensions and stiffness of the recoater blade change in a manner consistent with Hooke's law. However, a comparatively flexible recoater blade reduces the likelihood the object is damaged during manufacturing. A comparatively stiff blade (e.g., a steel blade, etc.) can damage the object during manufacturing due to the high stiffness of the blade. However, the stiffness of the recoater blade can result in tighter part tolerances and consistent recoating thickness. Additionally, a comparatively fast-moving recoating blade can abrade and damage the previously deposited layers. To prevent damage to parts, a speed of the recoater blade can be decreased, which can greatly increase a length of the manufacturing process, thereby decreasing productivity.

Examples disclosed herein overcome the above-noted deficiencies via recoater blades with variable stiffness and recoating speeds. Examples disclosed herein enable the selective and dynamic control of the stiffness and speed of the recoater blade between layers and during the recoating of each layer. In some examples disclosed herein, the stiffness of the recoater is controlled via elongating the recoater blade via one or more control pins. In some examples disclosed herein, the control pins are articulated via electromagnetic, and/or pneumatic forces. In some examples disclosed herein, the recoater blade uses a rotatable split blade, which enables the stiffness of the recoater blade to be changed based on the angle of the blade. In some examples disclosed herein, the speed and stiffness of the recoater blade can be determined based on the qualities of the previously deposited layers (e.g., complex geometries, the wall thickness, overhangs, etc.).

FIG. 1 illustrates an example additive manufacturing machine 101 in which the methods and apparatus disclosed herein can be implemented. The additive manufacturing machine 101 includes a laser source 102, lenses 104, a scanning mirror 106, a laser beam 110, a recoater 112, a powder feed compartment 114, a powder feed piston 116, a print bed 118, and a build piston 120. The additive manufacturing machine 101 also includes a computing system 125 in communication with system components of the additive manufacturing machine 101, and recoater parameter controller 128.

A powder bed fusion process (e.g., direct metal laser melting (DMLM), electron beam melting (EBM), selective laser melting (SLM), etc.) includes the use of a laser, an electron beam, and/or a thermal print head to melt and fuse the material powder together. The operation of the additive manufacturing machine 101 includes spreading of the powder material over previous layers (e.g., using a roller, blade, etc.), with a reservoir (e.g., powder feed compartment 114) providing a supply of fresh material powder. For example, a DMLM process can commence with a recoater 112 spreading a thin layer (e.g., 0.1 mm thick layer, etc.) of metal powder (e.g., stainless steel, titanium, aluminum, cobalt chrome, steel, etc.) on the print bed 118 of a build compartment. The recoater 112 has a stiffness that affects the recoating thickness and overall part tolerancing. In the illustrated example of FIG. 1, the recoater 112 has an adjustable stiffness and speed that can be changed based on the characteristics (e.g., layer geometry, feature thickness, etc.) of the previous disposed layer(s). Example implementations of the recoater 112 are described below in conjunction with FIGS. 2A, 2B and 3. While examples described herein are described with reference to a recoater blade, some or all of the teachings of this disclosure can include any other type of recoating mechanism (e.g., a roller, etc.).

Based on a given .STL file, the laser beam 110 is directed to create a cross-section of the object by melting (e.g., fully melting, partially melting, etc.) the metal particles on the print bed 118. For example, melting of the metal powder occurs where the laser beam 110 meets the top surface of the powder bed 118. The laser beam 110 is deflected off using the scanning mirror 106 and optics (e.g., lenses 104) to focus the beam 110 on the surface of the powder bed 118. The beam 110 is moved in the X and Y dimensions using a galvanometer system 108 that permits rotation of the deflecting mirror(s) 106. Once a single layer is complete, the print bed 118 is lowered (e.g., using the build piston 120) to allow the process to be repeated to form a subsequent layer, with a new layer of powder spread (e.g., using the recoater 112 once the powder feed piston 116 raises the powder feed 114) across the previous layer. Once all layers have been fused and added, the excess unmelted powder is removed during post-processing (e.g., brushed or blown away, etc.). In some examples described herein, the print bed 118 includes a metal powder as a substrate material. In other examples, any other substrate material can be used (e.g., plastic, ceramics, etc.).

The additive manufacturing machine 101 also includes a computing system 125 and a recoater parameter controller 128. The computing system 125 may include disk arrays or multiple workstations (e.g., desktop computers, workstation servers, laptops, etc.) in communication with one another. In the illustrated example of FIG. 1, the computing system 125 is in communication 123 with the additive manufacturing machine 101 via one or more wired and/or wireless networks. Such a network can be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

The example recoater parameter controller 128 of FIG. 1 can include hardware, software, firmware, robots, machines, etc., structured to control the stiffness and speed of the recoater 112. The recoater parameter controller 128 determines the exposure characteristics (e.g., layer geometry, overhangs, wall thickness, etc.) of the deposited layer(s). In some examples, the recoater parameter controller 128 can interface with an example imager 130 and/or another suitable device to determine the part geometry via communication with the computing system 125. In some examples, the recoater parameter controller 128 can cause the elongation, stiffness, and/or speed of the recoater 112 to change between layers. While examples disclosed herein are described with reference to a powder bed fusion technique/process of additive manufacturing, the examples disclosed herein can be implemented with any other suitable additive manufacturing technique (e.g., binder jet fusion, selective laser sintering (SLS), extrusion, photopolymerization, material jetting, sheet lamination, direct energy deposition (DED), etc.). In some examples, the recoater parameter controller 128 can control the elongation, stiffness, and/or speed of the recoater 112 during the recoating of a layer. An example implementation of the recoater parameter controller 128 is described below in conjunction with FIG. 4.

The imager 130 is a device that captures images of the powder bed 118. In some examples, the recoater parameter controller 128 can analyze the geometry/condition of the deposited layer(s) based on the output of the imager 130. The imager 130 can be implemented by a video camera, a static image camera, etc. In such examples, the imager 130 can periodically capture images of the powder bed 118 between each of the layers. In other examples, the imager 130 can continuously record the powder bed 118. In some examples, the imager 130 can be implemented by a camera that captures images in any suitable spectrum (e.g., visible light, thermal, electromagnetic spectrum, etc.). In some examples, the imager 130 can be implemented via radar (e.g., ultra-wind band (UWB) radar, etc.) or another similar device that allows the topography of the deposited layer(s) to be determined.

Figure 2A:
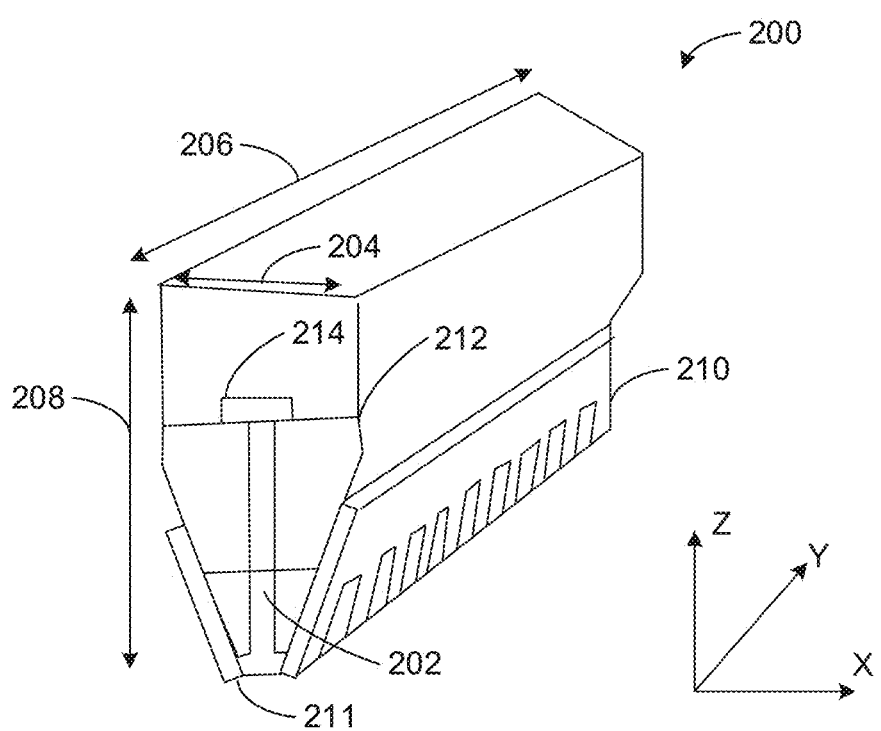
FIG. 2A is an example implementation of the blade of FIG. 1 enabling the variation of the stiffness of the blade via the articulation of a control pin disposed therein.

FIG. 2A is an example recoater 200 that can implement the example recoater 112 of FIG. 1 and provide variation in the stiffness of the recoater 200 via the articulation of an example control pin 202 disposed therein. In the illustrated example of FIG. 2A, the example recoater 112 has an example width 204, an example length 206, and example depth 208, which are the dimensions of the recoater 200 oriented along the X-axis, Y-Axis, Z-axis, respectively. The example recoater 200 includes example blades 210, 211 and an example core 212. In the illustrated example of FIG. 2A, the control pin 202 moves within the core 212.

During the operation of the additive manufacturing machine 101, the recoater 200 moves along the X-axis to recoat the print bed 118 with powder. The blades 210, 211 are configured to evenly spread the powder over the print bed 118 and includes several indented portions. Depending on the geometry of the already deposited layers, the recoater 200 can deflect after impacting the deposited layers. In such examples, the geometry and material of the blades 210, 211 and core 212 can affect the degree of deflection of the recoater 200. For example, if the blades 210, 211 and/or core 212 are in flexible configuration, the recoater 200 can deflect to a degree that prevents damage to the deposited layer(s). In such examples, the deflection of the blades 210, 211 and the core 212 can affect the distribution of the recoated powder. In some examples, the repeated deflection of the blades 210, 211 and core 212 can cause the blade to undergo relief hysteresis, which also affects the distribution of the recoated powder. In other examples, the blades 210, 211 and/or the core 212 can be in a stiff configuration. In such examples, the deflection of the blades 210, 211 and core 212 is minimal, which can cause damage to the deposited layers.

The blades 210, 211 can be composed of material such as rubber, metal, ceramic, plastic, etc. In some examples, the core 212 can be composed of the same material as the blades 210, 211. In other examples, the core 212 can be composed of a different material than the blades 210, 211 (e.g., rubber, metal, ceramic, plastic, etc.). In the illustrated example of FIG. 2A, the blades 210, 211 and the core 212 are illustrated as separate parts. In such examples, the blades 210, 211 and core 212 can be coupled together via one or more fasteners (e.g., screws, nails, bolts, etc.), chemical adhesives, press fits, etc. In other examples, the blades 210, 211 and core 212 can be a unitary part.

The control pin 202 moves within the recoater 200 to change the stiffness of the recoater 200. In the illustrated example of FIG. 2A, the control pin 202 is coupled to the blade 210, 211. As such, the control pin 202 moves within the recoater 200, and the blades 210, 211 move relative to the core 212. In the illustrated example of FIG. 2A, the control pin 202 extends along at least portion of the length 206 of the recoater 200 (e.g., the entirety of the recoater 200, 50% of the recoater 200, 75% of the recoater 200, etc.). In some examples, if the control pin 202 is controlled via electromagnetic forces, the control pin 202 can be composed of a ferrous material. In other examples, the control pin 202 can be composed of material such as a ferrous metal, a non-ferrous metal, a plastic, a ceramic, etc. In such examples, the control pins 202 can be controlled such as using pneumatic forces, piezoelectric forces, direct mechanical forces, indirect mechanical forces, etc. The movement of the example control pin 202 is described in greater detail below in conjunction with FIG. 2B.

Figure 2B:
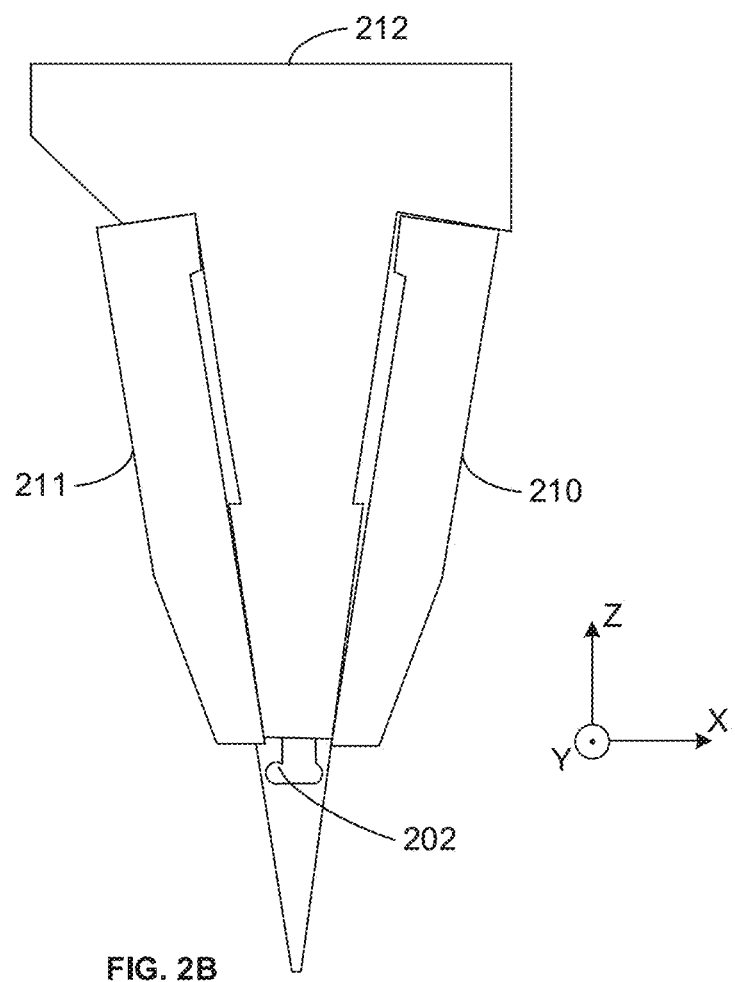
FIG. 2B illustrates the control pin of FIG. 1 in additional detail.

FIG. 2B illustrates the control pin 202 of FIG. 1 in additional detail. In such examples, the displacement of the control pin 202 can be controlled by an example electromagnet 214 disposed within the recoater 200. In such examples, the electromagnet 214 can displace (e.g., repel, attract, etc.) the control pin 202 along the depth 208 of the blade. For example, the recoater parameter controller 128 of FIG. 1 can change the polarity of the electromagnet by modulating the current flowing through the electromagnet 214. In other examples, the electromagnet 214 can be absent. In such examples, the control pin 202 can be controlled (e.g., displaced vertically and/or horizontally, etc.) by another mechanism. For example, the electromagnet 214 can be replaced with a pneumatic system, a hydraulic system, a piezoelectric system, a direct mechanical system, an indirect mechanical system, etc.

The relationship between the vertical displacement of the control pin 202, the total effective length of the recoater 112 and the stiffness of the recoater 200 can be determined as follows:

$$f = \frac{F(l)^3}{3EI} \quad (1)$$

wherein f is the deflection, F is the force causing the deflection, l is the depth 208 of the recoater 112, and I is the moment of inertia of the recoater 200. The moment of the inertia and modulus of elasticity of the recoater 200 depend on the material and geometry of the recoater 200. The force causing the deflection of the recoater varies based on the friction and normal forces caused by moving the recoater 200 over the powder bed 118. Accordingly, the deflection of the recoater 200 (e.g., the stiffness of the recoater 200, etc.) is proportionate to the cube of the total length of the recoater 200.

As such, as the control pin 202 moves vertically upwards (e.g., away from the print bed 118, etc.), which moves the blades 210, 211 vertically upwards relative to the core 212. By moving the blades 210, 211 upward relative to the core 212, the total length of the recoater 200 decreases. By reducing the total length of the recoater 200, the deflection of the recoater 200 decreases during the recoating process. As such, as the control pin 202 moves upward, the stiffness of the recoater 200 increases. Similarly, as the control element moves vertically downward (e.g., towards the print bed 118, etc.), the blades 210, 211 move vertically downward relative to the core 212, which increases the total length of the recoater 200. By increasing the total length of the recoater 200, the deflection of the recoater 200 increases, which decreases the stiffness of the blade.

In the illustrated example of FIG. 2B, the control pin 202 is a split control pin. In such examples, the split of the control pin 202 can widen along the width 204 of the recoater 200 to control the distance between the blades 210, 211, which can change the thickness of the recoated powder material. For example, the electromagnet 214 can cause the blades 210, 211 to have opposing polarities, which causes the blades 210, 211 to separate (e.g., become further away from one another, etc.) along the width 204 of the recoater 200. In other examples, the control pin 202 can be another control element such as a control bolt, a threaded bolt, a split control bolt, etc.

Figure 3:
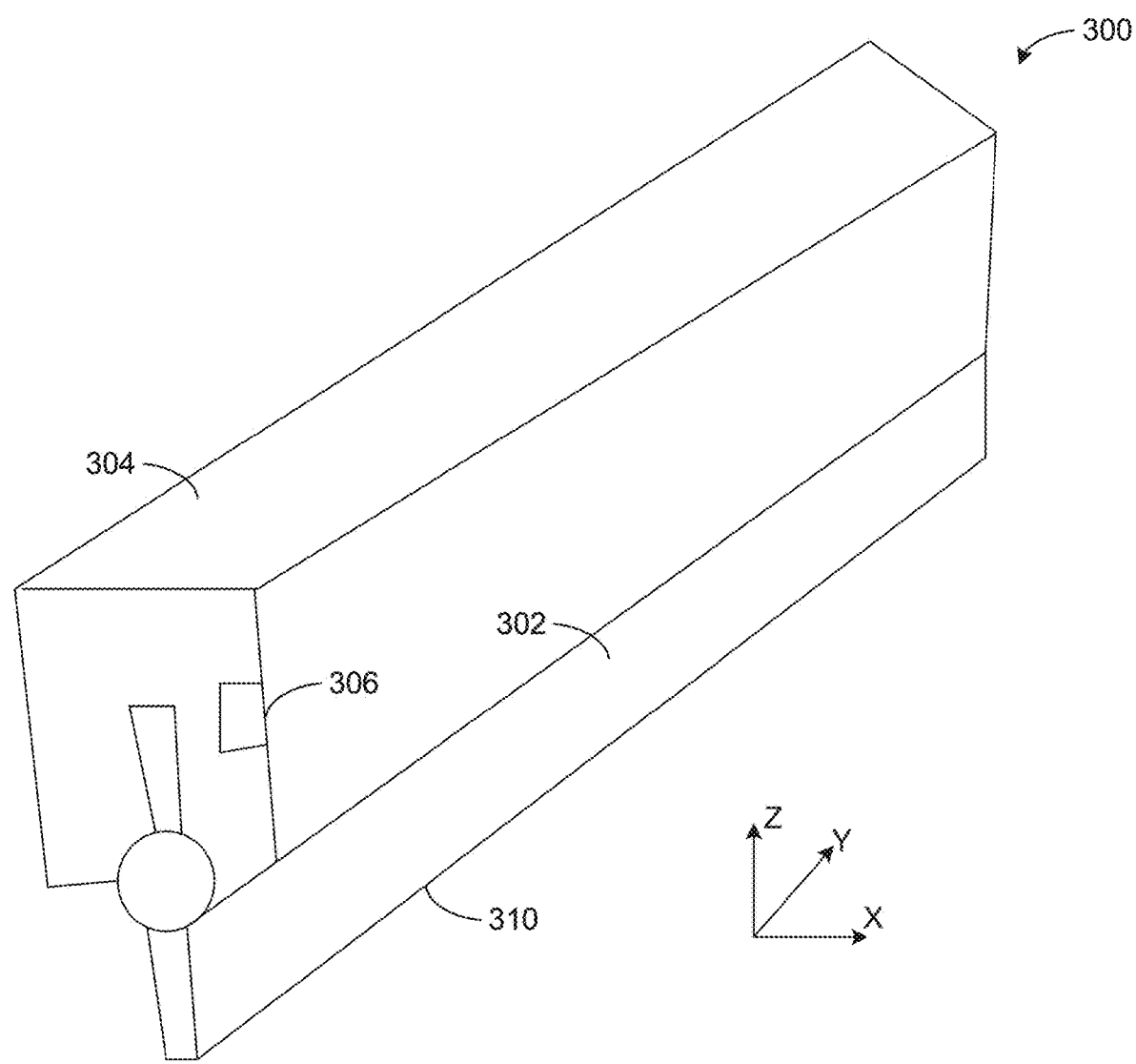
FIG. 3 is another implementation of the blade of FIG. 1 enabling the variation of the stiffness of the blade via rotation of the blade.

FIG. 3 is another example recoater 300 that may implement the recoater 112 of FIG. 1 enabling the variation of the stiffness of the recoater 300 via rotation of an example blade 302. In the illustrated example of FIG. 3, the recoater 112 includes an example blade holder 304, an example joint 306, and an example rotational mechanism 308. In the illustrated example of FIG. 3, the blade 302 has an example tip 310.

In the illustrated example of FIG. 3, the blade 302 is a straight blade. In other examples, the blade 302 can be implemented as a rake, a splitted blade, a hollow-edged blade, and/or other combination thereof. The rotational mechanism 308 rotates the blade 302 about the joint 306 to change the angle of incidence of the blade 302 on the powder bed 118. In some examples, the rotational mechanism 308 can be implemented by a combination of springs, electromagnets, and/or other hardware components. Additionally or alternatively, the rotational mechanism 308 can be implemented by a pneumatic and/or hydraulic system.

During the operation of the recoater 112, the rotational mechanism 308 rotates the blade 302 about the joint 306 to change the stiffness of the recoater 112. For example, the rotational mechanism 308 can articulate the joint 306 to move the blade 302 between a first rotational position relative to the blade holder 304 and a second rotational position relative to the blade holder 304. As the blade 302 rotates, the tip 310 of the blade 302 moves farther away from the powder bed 118. As such, the rotation of the blade 302 can help ensure that material overhangs of the deposited layer(s) are not impacted by the blade 302 during recoating. In some examples, the rotation of the blade 302 can change the overall stiffness of the recoater 300. For example, as the angle of the blade 302 changes, the overall length recoater changes, allowing the stiffness of the recoater 300 to vary according to Equation (1).

Figure 4:
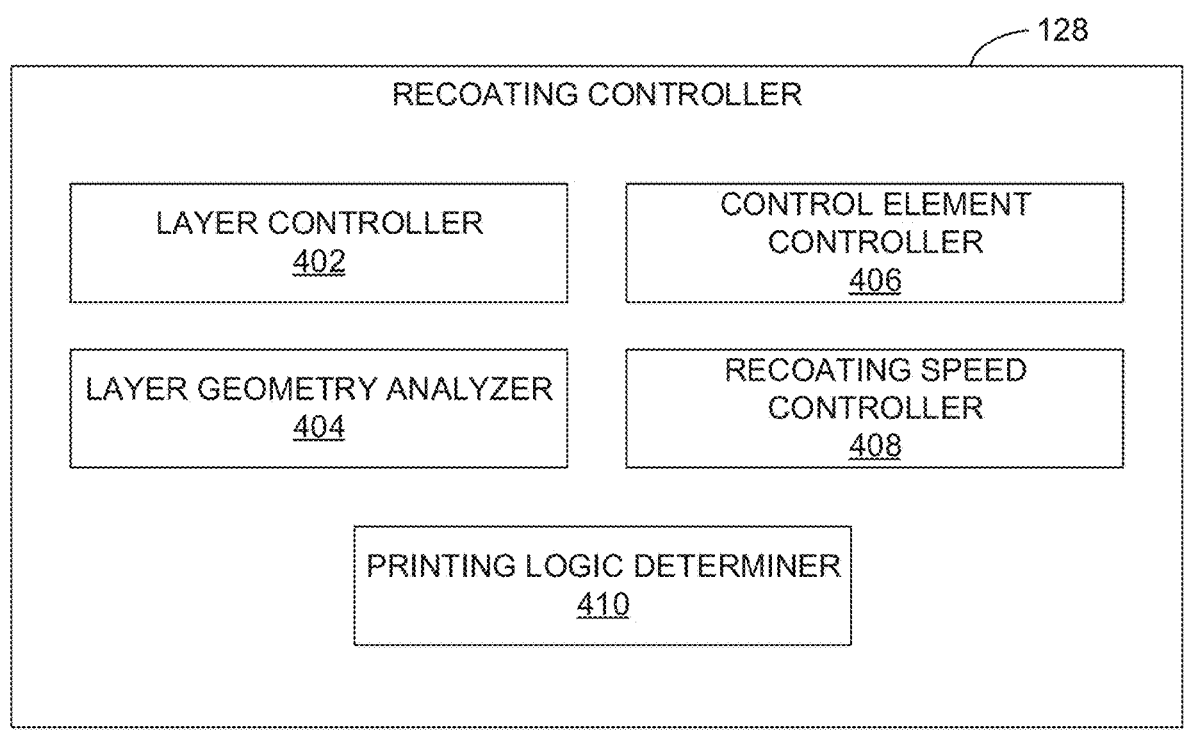
FIG. 4 is a block diagram illustrating the example recoating parameter controller of FIG. 1 in additional detail.

FIG. 4 is a block diagram illustrating the example recoating parameter controller 128 of FIG. 1 in additional detail. In the illustrated example of FIG. 4, the recoating parameter controller 128 includes an example layer controller 402, an example layer geometry analyzer 404, an example control element controller 406, an example recoating speed controller 408, and an example printer logic determiner 410.

The example layer controller 402 causes the laser beam 110 of the additive manufacturing machine 101 to fuse a layer of the powder bed 118 to form a layer of the object. For example, the layer controller 402 can cause the laser beam 110 to create a cross-section of the object by melting the material particles on the print bed 118. In some examples, the layer controller 402 can cause the top surface of the powder bed 118 to fuse together into the layer. In some examples, the layer controller 402 controls the lenses 104 (and/or other optics, etc.) the deflecting mirror 106, the galvanometer system 108 to focus and move the beam. In some examples, the layer controller 402 can trigger the recoating process after a layer has been deposited. In such examples, the layer controller 402 can change the speed of the recoating process based on the output of the recoating speed controller 408. In some examples, the layer controller 402 changes the recoating speed of the recoater 112 between each iteration of the recoating process. Additionally or alternatively, the layer controller 402 varies the speed of the recoater 112 within an iteration of the recoating process.

The example layer geometry analyzer 404 analyzes the geometry and properties of each of the deposited layers to determine the exposure factors of the deposited layer(s). For example, the layer geometry analyzer 404 can determine if the previously deposited layers include overhangs, thin walls, and/or other factors that could be damaged during the recoating process. In some examples, the layer geometry analyzer 404 can interface with the imager 130 to determine the layer geometry. In some examples, the layer geometry analyzer 404 can determine the layer geometry and/or exposure elements using methods such as the layer geometry analyzer 404 can analyze the .STL file and/or any other parameter generated by the computing system 125 during the manufacture of the object via the additive manufacturing machine 101, etc.

The example control element controller 406 moves the control element of the recoater 112. For example, the control element controller 406 can articulate the control pin 202 to adjust the length of the recoater 200 of FIGS. 2A, 2B. In other examples, the control element controller 406 can operate the control the rotational mechanism 308 to rotate of blade 302 of FIG. 3. The example control element controller 406 can cause the control element to articulate in a manner consistent with the analysis of the layer geometry analyzer 404. For example, if the layer geometry analyzer 404 determines the deposited layer(s) have a geometry (e.g., overhangs, thin walls, etc.) that would cause the blade and/or deposited layer(s) to undergo damage at the current blade stiffness, the control element controller 406 can articulate the control element to cause the recoater 112 to have a lesser stiffness. In other examples, if the layer geometry analyzer 404 determines the deposited layer(s) have a geometry that would not cause the blade and/or deposited layer(s) to undergo damage at the current blade stiffness, the control element controller 406 can articulate the control element to cause the recoater 112 to have a greater stiffness. In some examples, if the layer geometry analyzer 404 determines a greater recoating layer thickness would be appropriate for the next layer, the control element controller 406 can adjust the control element in a manner to increase layer deposition thickness.

The example recoating speed controller 408 controls the speed the recoater 112. For example, if the layer geometry analyzer 404 determines the deposited layers have a geometry that can accommodate a greater recoating speed, the example recoating speed controller 408 can increase the speed of the recoater 112. In other examples, if the layer geometry analyzer 404 determines the deposited layers have a geometry that can accommodate the current recoating speed without incurring damage to the layer(s) and/or recoater, the example recoating speed controller 408 can decrease the speed of the recoater 112. In some examples, the recoating speed controller 408 can create a speed profile during the recoating process. For example, the recoating speed controller 408 can cause the recoater 112 to move at different speed during a single recoating iteration.

The example printer logic determiner 410 determines if an additional layer is to be deposited on the printer bed 118. For example, the printer logic determiner 410 can determine if additional layers are to be deposited to finish the object. In other examples, the printer logic determiner 410 can determine if another layer is to be deposited by another other suitable means (e.g., interfacing the computer system 115, etc.).

While an example manner of implementing the recoating parameter controller 128 of FIG. 1 is illustrated in FIG. 4, one or more of the elements, processes and/or devices illustrated in FIG. 4 may be combined, divided, re-arranged, omitted, eliminated and/or implemented in any other way. Further, the example layer controller 402, the example layer geometry analyzer 404, the example control element controller 406, the example recoating speed controller 408, the example printer logic determiner 410, and/or, more generally, the example recoating parameter controller 128 of FIG. 4 may be implemented by hardware, software, firmware and/or any combination of hardware, software and/or firmware. Thus, for example, any of the example layer controller 402, the example layer geometry analyzer 404, the example control element controller 406, the example recoating speed controller 408, the example printer logic determiner 410 and/or, more generally, the example recoating parameter controller 128 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example layer controller 402, the example layer geometry analyzer 404, the example control element controller 406, the example recoating speed controller 408, the example printer logic determiner 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example recoating parameter controller 128 of FIG. 1 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the recoating parameter controller 128 of FIG. 1 is shown in FIG. 4. The machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example recoating parameter controller 128 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The process 500 begins at block 502. At block 502, the layer controller 402 fuses the first layer of an object been manufactured via the additive manufacturing machine 101 (e.g., powder bed fusion, binder fusion, etc.). For example, the layer controller 402 can cause the laser beam 110 of the additive manufacturing machine 101 to fuse a layer of the powder bed 118 to form the next layer of the printing object. For example, the layer controller 402 can cause the laser beam 110 to create a cross-section of the object by completely melting the material particles on the print bed 118. In some examples, the layer controller 402 can cause the top surface of the powder bed 118 to fuse together into the next layer. In some examples, the layer controller 402 controls the lenses 104 (and/or other optics, etc.) the deflecting mirror 106, the galvanometer system 108 to focus and move the beam.

At block 504, the layer geometry analyzer 404 analyzes layer geometry to determine an appropriate blade stiffness and/or an appropriate blade stiffness profile. For example, the layer geometry analyzer 404 can analyze the deposited layer(s) for overhangs, thin walls and/or other geometric features that could cause damage during recoating. In some examples, the layer geometry analyzer 404 can interface with the imager 130 to determine the layer geometry. In other examples, the layer geometry analyzer 404 can determine the geometric properties of the layers by interfacing with the computer system 115. The layer geometry analyzer 404 can determine the optimal recoating stiffness based on the layer geometry. In some examples, the layer geometry analyzer 404 can determine a stiffness profile based on the layer geometry.

At block 506, the layer geometry analyzer 404 analyzes analyze layer geometry to determine appropriate layer thickness and/or appropriate thickness profile. For example, the layer geometry analyzer 404 can analyze the deposited layer(s) for overhangs, thin walls and/or other geometric features that could change the optimal recoating thickness. In some examples, the layer geometry analyzer 404 can interface with the imager 130 to determine the layer geometry. In other examples, the layer geometry analyzer 404 can determine the geometric properties of the layers by interfacing with the computer system 115. The layer geometry analyzer 404 can determine the optimal recoating thickness based on the layer geometry. In some examples, the layer geometry analyzer 404 can determine an optimal recoating thickness based on the layer geometry.

At block 508, the control element controller 406 adjust the control element position to achieve a desired blade stiffness and layer thickness. For example, the control element controller 406 can articulate the control pin 202 to adjust the length of the recoater 200 of FIGS. 2A, 2B. In other examples, the control element controller 406 can operate the control the rotational mechanism 308 to rotate of blade 302 of FIG. 3. The example control element controller 406 can cause the control element to articulate in a manner consistent with the analysis of the layer geometry analyzer 404. For example, if the layer geometry analyzer 404 determines the deposited layer(s) have a geometry (e.g., overhangs, thin walls, etc.) that would cause the blade and/or deposited layer(s) to undergo damage at the current blade stiffness, the control element controller 406 can articulate the control element to cause the recoater 112 to have a lesser stiffness. In other examples, if the layer geometry analyzer 404 determines the deposited layer(s) have a geometry that would not cause the blade and/or deposited layer(s) to undergo damage at the current blade stiffness, the control element controller 406 can articulate the control element to cause the recoater 112 to have a greater stiffness. In some examples, if the layer geometry analyzer 404 determines a greater recoating layer thickness would be appropriate for the next layer, the control element controller 406 can adjust the control element in a manner to increase layer deposition thickness.

At block 510, the layer geometry analyzer 404 analyzes layer exposure elements to determine appropriate coating speed and/or appropriate coating speed profile. For example, the layer geometry analyzer 404 can determine if they feature(s) of the disposed layer(s) (e.g., thin walls, overhangs, etc.) that could cause damage at higher recoating speeds. In other examples, the layer geometry analyzer 404 can determine if the layer geometry is simple (e.g., flat and without complex features, etc.). In such examples, the layer geometry analyzer 404 can determine the optimal recoating speed given the already fused layer(s).

At block 512, the recoating speed controller 408 recoats the print bed 118 at the determined speed. For example, the recoating speed controller 408 can cause the recoater 112 to recoat the print bed 118 at the speed determined by the layer geometry analyzer 404. In some examples, the recoating speed controller 408 can move at a constant speed for a given layer. In other examples, the recoating speed controller 408 can cause the recoater 112 to move at a variable speed according to a speed profile determined by the layer geometry analyzer 404.

At block 514, the layer controller 402 fuses the next layer of the object. For example, the layer controller 402 can cause the laser beam 110 of the additive manufacturing machine 101 to fuse a layer of the powder bed 118 to form the next layer of the printing object. For example, the layer controller 402 can cause the laser beam 110 to create a cross-section of the object by completely melting the material particles on the print bed 118. In some examples, the layer controller 402 can cause the top surface of the powder bed 118 to fuse together into the next layer. In some examples, the layer controller 402 controls the lenses 104 (and/or other optics, etc.) the deflecting mirror 106, the galvanometer system 108 to focus and move the beam.

At block 516, the printer logic determiner 410 determines if another layer of material is to be fused. For example, the printer logic determiner 410 can determine if additional layers are to finish the object being printed. In other examples, the printer logic determiner 410 can determine if another layer is to be deposited by interfacing with the computing system 125. If the printer logic determiner 410 determines another layer is to be deposited, the process 500 returns to block 504. If the printer logic determiner 410 determines another layer is not to be deposited, the process 500 ends.

Figure 5:
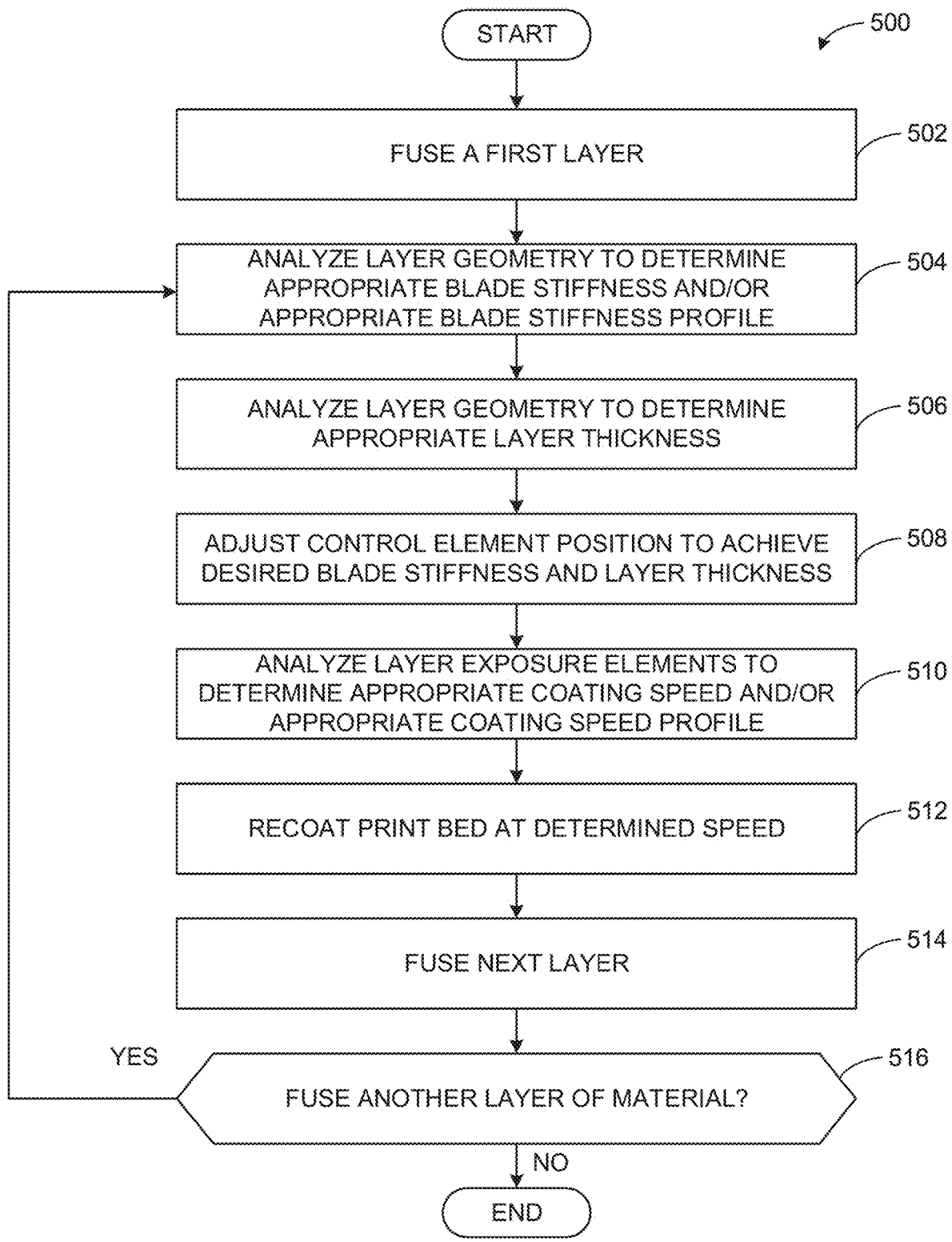
FIG. 5 is a flowchart representative of machine readable instructions which may be executed to implement the example recoating parameter controller of FIG. 1.
Figure 6:
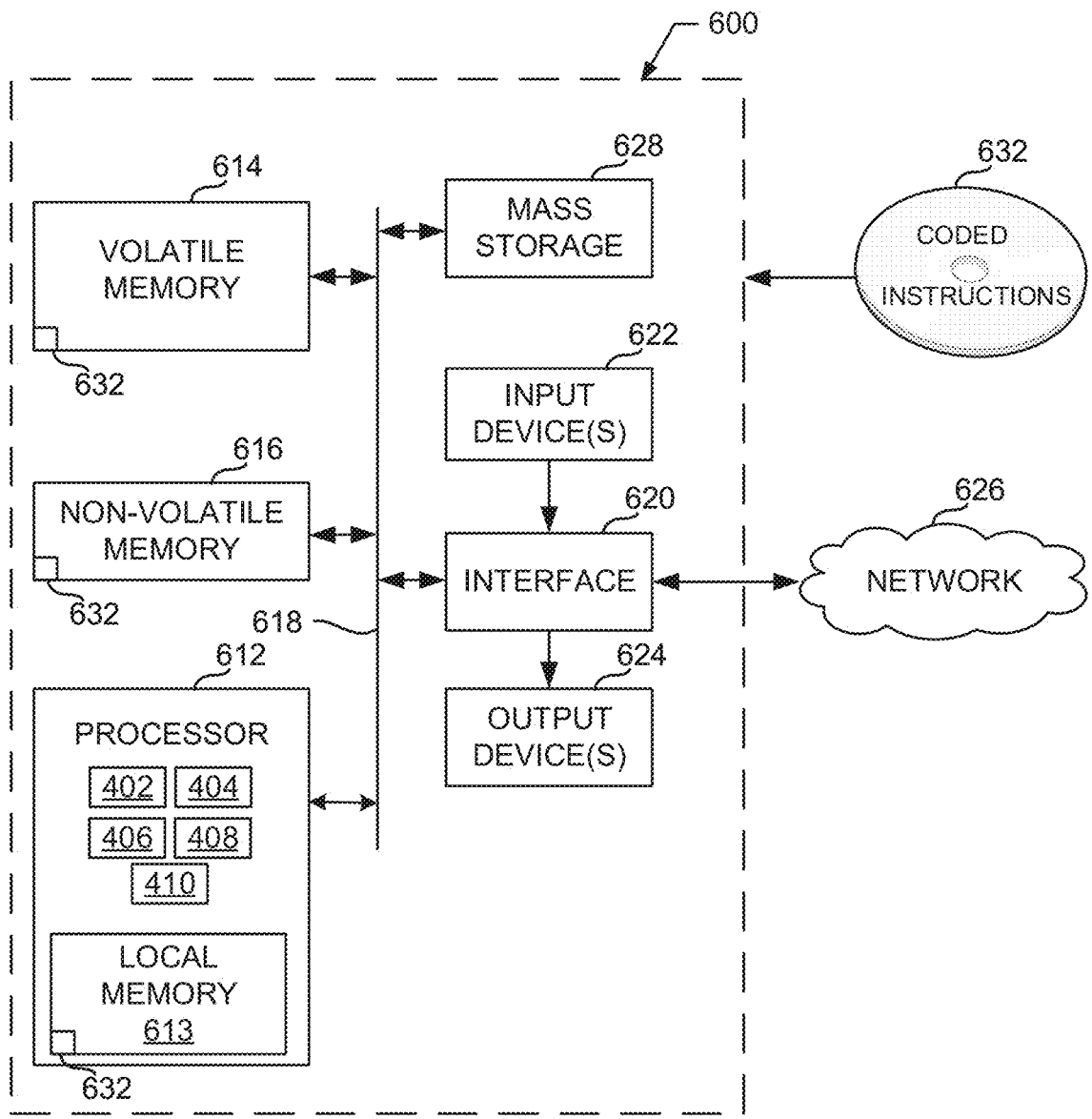
FIG. 6 is a block diagram of an example processing platform structured to execute the instructions of FIG. 5 to implement the example recoating parameter controller of FIG. 4.

FIG. 6 is a block diagram of an example processor platform 600 structured to execute the instructions of FIG. 5 to implement the recoating parameter controller 128 of FIGS. 1 and 4. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 612 implements the example layer controller 402, the example layer geometry analyzer 404, the example control element controller 406, the example recoating speed controller 408, and the printer logic determiner 410.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 5 may be stored in the mass storage device 628, in the volatile memory 614, in the non-volatile memory 616, and/or on a removable non-transitory computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the invention are provided by the subject matter of the following clauses:

1. A non-transitory computer readable medium including instructions, when executed, cause a machine to form a first layer of a part by joining a portion of substrate material via an additive manufacturing technique, recoat the substrate material via a blade having a first stiffness, determine, based on a geometry of the first layer of the part, a second stiffness, modify the blade to have the second stiffness by adjusting a control element within the blade, and recoat the substrate material via the blade.

2. The non-transitory computer readable medium of any preceding clause, wherein the substrate material is a metal powder and the additive manufacturing technique is powder bed fusion.

3. The non-transitory computer readable medium of any preceding clause, wherein the control pin is adjusted via an electromagnet.

4. The non-transitory computer readable medium of any preceding clause, wherein the control element is a pin coupled to the blade and the instructions cause the machine to modify the blade to have the second stiffness includes at least one of adjusting the control pin to move the blade away from the print bed to decrease a stiffness of the blade and adjusting the control pin to move the blade towards from the print bed to increase the stiffness of the blade.

5. The non-transitory computer readable medium of any preceding clause, wherein the instructions further cause the machine to determine a thickness of the second layer, and modify the blade based on the determined thickness by adjusting the control pin in a direction parallel to a movement of the blade during the recoating of the substrate material.

6. The non-transitory computer readable medium of any preceding clause, wherein the instructions further cause the machine to determine, based on a geometry of the first layer of the part, a stiffness profile, the stiffness profile including the second stiffness, a third stiffness, and a fourth stiffness, modify the blade to have the third stiffness by adjusting a control element within the blade at a first time during the recoating the substrate material via the blade, and modify the blade to have the fourth stiffness by adjusting a control element within the blade at a second time during the recoating the substrate material via the blade, the second time after the first time, the second time during the recoating the substrate material via the blade.

7. The non-transitory computer readable medium of any preceding clause, wherein the control element is a joint and the modifying the blade to have the second stiffness includes modifying, via the joint, the angle of incidence of the blade relative to the first layer.

8. An apparatus for recoating a printer bed of an additive manufacturing machine, comprising a blade holder, a blade, and a control element disposed within the blade holder, the control element to move the blade between a first position and a second position, the apparatus having a first stiffness when the blade is in the first position, the apparatus having a second stiffness when the blade is in the second position, the first stiffness greater than the second stiffness.

9. The apparatus of any preceding clause, wherein the control element is a pin, the first position includes the blade at a first vertical displacement from the blade holder, and the second position includes the blade at a second vertical displacement from the blade holder, the second vertical displacement greater than the first displacement.

10. The apparatus of any preceding clause, wherein the control element is a joint, the first position includes the blade at a first rotational position relative to the blade holder, and the second position includes the blade at a second rotational position relative to the blade holder.

11. The apparatus of any preceding clause, further including an electromagnet adjustable between a first polarity and a second polarity, the first polarity causing the control element to move to the first position, the second polarity causing the control element to move to the second position.

12. The apparatus of any preceding clause, wherein the blade is a first blade and further including a second blade opposite the first blade.

13. The apparatus of any preceding clause, wherein the control element causes the first blade to move between a third position relative to the second blade and a fourth position relative to the third blade.

14. The apparatus of any preceding clause, further including a controller to determine, based on a feature of a fused layer on a print bed, to recoat the print bed when the blade is in the first position or to recoat the print bed when blade is in the second position.

15. An apparatus for manufacturing an object via additive manufacturing, the apparatus comprising a bed including a material substrate, a beam emitter, and a recoater to coat material across the bed, the recoater including a blade holder, a blade, and a control element disposed within the blade holder, the control element to move the blade between a first position and a second position, the apparatus having a first stiffness when the blade is in the first position, the apparatus having a second stiffness when the blade is in the second position, the first stiffness greater than the second stiffness.

16. The apparatus of any preceding clause, wherein the control element is a pin, the first position includes the blade at a first vertical displacement from the blade holder, and the second position includes the blade at a second vertical displacement from the blade holder, the second vertical displacement greater than the first displacement.

17. The apparatus of any preceding clause, wherein the control element is a joint, the first position includes the blade at a first rotational position relative to the blade holder, and the second position includes the blade at a second rotational position relative to the blade holder.

18. The apparatus of any preceding clause, further including an electromagnet adjustable between a first polarity and a second polarity, the first polarity causing the control element to move to the first position, the second polarity causing the control element to move to the second position.

19. The apparatus of any preceding clause, wherein the blade is a first blade and further including a second blade opposite the first blade.

20. The apparatus of any preceding clause, wherein the control element causes the first blade to move between a third position relative to the second blade and a fourth position relative to the third blade.

21. A method comprising forming a first layer of a part by joining a portion of substrate material via an additive manufacturing technique, recoating the substrate material via a blade having a first stiffness, determining, based on a geometry of the first layer of the part, a second stiffness, modifying the blade to have the second stiffness by adjusting a control element within the blade, and recoating the substrate material via the blade.

22. The method of any preceding claim, wherein the substrate material is a metal powder and the additive manufacturing technique is powder bed fusion.

23. The method of any preceding claim, wherein the control pin is adjusted via an electromagnet.

24. The method of any preceding claim, wherein the control element is a pin coupled to the blade and modifying the blade to have the second stiffness includes at least one of adjusting the control pin to move the blade away from the print bed to decrease a stiffness of the blade, and adjusting the control pin to move the blade towards from the print bed to increase the stiffness of the blade.

25. The method of any preceding claim, further including determining a thickness of the second layer, and modifying the blade based on the determined thickness by adjusting the control pin in a direction parallel to a movement of the blade during the recoating of the substrate material.

26. The method of any preceding claim, further including determining, based on a geometry of the first layer of the part, a stiffness profile, the stiffness profile including the second stiffness, a third stiffness, and a fourth stiffness, modifying the blade to have the third stiffness by adjusting a control element within the blade at a first time during the recoating the substrate material via the blade, and modifying the blade to have the fourth stiffness by adjusting a control element within the blade at a second time during the recoating the substrate material via the blade, the second time after the first time, the second time during the recoating the substrate material via the blade.

27. The method of any preceding claim, wherein the control element is a joint and the modifying the blade to have the second stiffness includes modifying, via the joint, the angle of incidence of the blade relative to the first layer.

28. An apparatus comprising a layer controller to form a first layer of a part by joining a portion of substrate material via an additive manufacturing technique and recoat the substrate material via a blade having a first stiffness, a layer geometry analyzer to determine, based on a geometry of the first layer of the part, a second stiffness, a control element controller to modify the blade to have the second stiffness by adjusting a control element within the blade, and the layer controller to recoat the substrate material via the blade.

29. The apparatus of any preceding claim, wherein the substrate material is a metal powder and the additive manufacturing technique is powder bed fusion.

30. The apparatus of any preceding claim, wherein the control pin is adjusted via an electromagnet.

31. The apparatus of any preceding claim, wherein the control element is a pin coupled to the blade and the control element controller modifies the blade to have the second stiffness includes at least one of adjusting the control pin to move the blade away from the print bed to decrease a stiffness of the blade, and adjusting the control pin to move the blade towards from the print bed to increase the stiffness of the blade.

32. The apparatus of any preceding claim, wherein the layer geometry analyzer determines a thickness of the second layer and further including a control element controller to modify the blade based on the determined thickness by adjusting the control pin in a direction parallel to a movement of the blade during the recoating of the substrate material.

33. The apparatus of any preceding claim, wherein the layer geometry analyzer determines based on a geometry of the first layer of the part, a stiffness profile, the stiffness profile including the second stiffness, a third stiffness, and a fourth stiffness, the control element controller to modify the blade to have the third stiffness by adjusting a control element within the blade at a first time during the recoating the substrate material via the blade and modify the blade to have the fourth stiffness by adjusting a control element within the blade at a second time during the recoating the substrate material via the blade, the second time after the first time, the second time during the recoating the substrate material via the blade.

34. The apparatus of any preceding claim, wherein the control element is a joint and the control element controller modifies, via the joint, the angle of incidence of the blade relative to the first layer.

The following claims are hereby incorporated into this Detailed Description by this reference, with each claim standing on its own as a separate embodiment of the present disclosure.

What is claimed is:

1. A non-transitory computer readable medium including instructions, which when executed, cause a machine to:
   form a layer of a part by joining a portion of substrate material via an additive manufacturing technique;
   recoat the substrate material via a blade having a first stiffness;
   determine, based on a geometry of the layer of the part, a second stiffness;
   modify the blade to have the second stiffness by adjusting a control element within the blade; and
   recoat the substrate material via the blade.

2. The non-transitory computer readable medium of claim 1, wherein the substrate material is a metal powder and the additive manufacturing technique is powder bed fusion.

3. The non-transitory computer readable medium of claim 1, wherein the control element is adjusted via an electromagnet.

4. The non-transitory computer readable medium of claim 1, wherein the control element is a pin coupled to the blade and the instructions cause the machine to modify the blade to have the second stiffness includes at least one of:
   adjusting the pin to move the blade away from a print bed to decrease a stiffness of the blade; and
   adjusting the pin to move the blade towards from the print bed to increase the stiffness of the blade.

5. The non-transitory computer readable medium of claim 4, wherein the instructions further cause the machine to:
   determine a thickness of the layer; and
   modify the blade based on the determined thickness by adjusting the pin in a direction parallel to a movement of the blade during the recoating of the substrate material.

6. The non-transitory computer readable medium of claim 1, wherein the instructions further cause the machine to:
   determine, based on the geometry of the layer of the part, a stiffness profile, the stiffness profile including the second stiffness, a third stiffness, and a fourth stiffness;
   modify the blade to have the third stiffness by adjusting the control element within the blade at a first time during the recoating the substrate material via the blade; and
   modify the blade to have the fourth stiffness by adjusting the control element within the blade at a second time during the recoating the substrate material via the blade, the second time after the first time, the second time during the recoating the substrate material via the blade.

7. The non-transitory computer readable medium of claim 1, wherein the control element is a joint and the modifying the blade to have the second stiffness includes modifying, via the joint, an angle of incidence of the blade relative to the layer.

8. An apparatus comprising:
   machine readable instructions; and
   programmable circuitry to at least one of instantiate or execute the machine readable instructions to:
      form a layer of a part by joining a portion of substrate material via an additive manufacturing technique;
      recoat the substrate material via a blade having a first stiffness;
      determine, based on a geometry of the layer of the part, a second stiffness;
      modify the blade to have the second stiffness by adjusting a control element within the blade; and
      recoat the substrate material via the blade.

9. The apparatus of claim 8, wherein the substrate material is a metal powder and the additive manufacturing technique is powder bed fusion.

10. The apparatus of claim 8, wherein the control element is adjusted via an electromagnet.

11. The apparatus of claim 8, wherein the control element is a pin coupled to the blade and the programmable circuitry is to modify the blade to have the second stiffness by at least one of:
   adjusting the pin to move the blade away from a print bed to decrease a stiffness of the blade; and
   adjusting the pin to move the blade towards from the print bed to increase the stiffness of the blade.

12. The apparatus of claim 11, wherein the programmable circuitry is to:
   determine a thickness of the layer; and
   modify the blade based on the determined thickness by adjusting the pin in a direction parallel to a movement of the blade during the recoating of the substrate material.

13. The apparatus of claim 8, wherein the programmable circuitry is to:
   determine, based on the geometry of the layer of the part, a stiffness profile, the stiffness profile including the second stiffness, a third stiffness, and a fourth stiffness;
   modify the blade to have the third stiffness by adjusting the control element within the blade at a first time during the recoating the substrate material via the blade; and
   modify the blade to have the fourth stiffness by adjusting the control element within the blade at a second time during the recoating the substrate material via the blade, the second time after the first time, the second time during the recoating the substrate material via the blade.

14. The apparatus of claim 8, wherein the control element is a joint and the modifying the blade to have the second stiffness includes modifying, via the joint, an angle of incidence of the blade relative to the layer.

15. A method comprising:
   forming a layer of a part by joining a portion of substrate material via an additive manufacturing technique;

recoating the substrate material via a blade having a first stiffness;

determining, based on a geometry of the layer of the part, a second stiffness;

modifying the blade to have the second stiffness by adjusting a control element within the blade; and recoating the substrate material via the blade.

16. The method of claim 15, wherein the substrate material is a metal powder and the additive manufacturing technique is powder bed fusion.

17. The method of claim 15, wherein the control element is a pin coupled to the blade and the modifying the blade to have the second stiffness includes at least one of:

adjusting the pin to move the blade away from a print bed to decrease a stiffness of the blade; and adjusting the pin to move the blade towards from the print bed to increase the stiffness of the blade.

18. The method of claim 17, further including:

determining a thickness of the layer; and modifying the blade based on the determined thickness by adjusting the pin in a direction parallel to a movement of the blade during the recoating of the substrate material.

19. The method of claim 15, further including:

determining, based on the geometry of the layer of the part, a stiffness profile, the stiffness profile including the second stiffness, a third stiffness, and a fourth stiffness;

modifying the blade to have the third stiffness by adjusting the control element within the blade at a first time during the recoating the substrate material via the blade; and modify the blade to have the fourth stiffness by adjusting the control element within the blade at a second time during the recoating the substrate material via the blade, the second time after the first time, the second time during the recoating the substrate material via the blade.

20. The method of claim 15, wherein the control element is a joint and the modifying the blade to have the second stiffness includes modifying, via the joint, an angle of incidence of the blade relative to the layer.

* * * * *